US008651136B2

(12) United States Patent
Duboy et al.

(10) Patent No.: US 8,651,136 B2
(45) Date of Patent: Feb. 18, 2014

(54) VALVE WITH A METAL GASKET

(75) Inventors: Dominique Duboy, Gradignan (FR); Pascal Vinzio, Eysines (FR)

(73) Assignee: KSB S.A.S., Gennevilliers Cedex (FR)

( * ) Notice: Subject to any disclaimer, the term of this patent is extended or adjusted under 35 U.S.C. 154(b) by 0 days.

(21) Appl. No.: 13/697,052

(22) PCT Filed: Apr. 15, 2011

(86) PCT No.: PCT/FR2011/000225
§ 371 (c)(1),
(2), (4) Date: Dec. 18, 2012

(87) PCT Pub. No.: WO2011/141641
PCT Pub. Date: Nov. 17, 2011

(65) Prior Publication Data
US 2013/0105719 A1    May 2, 2013

(30) Foreign Application Priority Data

May 11, 2010  (FR) ...................................... 10 02007

(51) Int. Cl.
*F16K 1/226*  (2006.01)
(52) U.S. Cl.
USPC ...... 137/601.06; 251/174; 251/192; 251/306; 251/357; 251/360

(58) Field of Classification Search
USPC ......... 251/170, 173–174, 192, 306–307, 357, 251/360–363, 368; 137/601.06
See application file for complete search history.

(56) References Cited

U.S. PATENT DOCUMENTS

| 4,194,749 | A | * | 3/1980 | Bonafous | 251/306 |
| 4,247,079 | A | * | 1/1981 | Friess | 251/174 |
| 4,396,199 | A | * | 8/1983 | Boyd et al. | 251/306 |
| 4,415,170 | A | * | 11/1983 | Bonafous | 251/306 |
| 5,178,364 | A | * | 1/1993 | Garrigues et al. | 251/306 |
| 5,249,774 | A | * | 10/1993 | Mazel et al. | 251/306 |
| 2007/0215834 | A1 | | 9/2007 | Helfer et al. | |

FOREIGN PATENT DOCUMENTS

| CH | 616 496 A5 | 3/1980 |
| EP | 0 378 342 A1 | 7/1990 |
| FR | 2 615 580 A1 | 11/1988 |

* cited by examiner

*Primary Examiner* — John Bastianelli
(74) *Attorney, Agent, or Firm* — Renner, Kenner, Greive, Bobak, Taylor & Weber

(57) ABSTRACT

A faucet includes an annular body (101), a throttle valve (102) constituting a seat and an annular metal gasket positioned therebetween while being accommodated in a recess, the movable sealing element being connected by a plate to a static sealing element gripped within the recess, the plate is flexible and there is play between the recess and the part of the main surfaces of the dynamic sealing element closest to the seat (102) when said element is remote from the seat (102).

11 Claims, 6 Drawing Sheets

VALVE WITH A METAL GASKET

In the manufacture of butterfly valves, the operating conditions of which involve a combination of temperatures lower than −50° C. or higher than 270° C. and cut-off pressures between the upstream and downstream sides of more than 25 bar, use is commonly made of components which are made exclusively of metal in order to ensure correct functioning and complete sealing.

In order to arrive at acceptable sealing performances, kinematics and constructions with triple off-centring have been developed; see the solutions described in the following patents: DE 2057305, FR 2674599, EP 0993571, FR 2698147, FR 2554539, DE 010250774, U.S. Pat. No. 3,945,398, U.S. Pat. No. 4,480,815 and EP 0145632.

These solutions offer a certain amount of progress compared with double-offset butterfly valves, which have only single off-centring and single off-setting. This third off-centring, which corresponds to the inclination of the machining cone of the body and/or of the butterfly, makes it possible to limit the friction between the seat and the sealing gasket.

These constructions make it possible to achieve a service pressure of up to 100 bar and are satisfactory when the pressure to be sealed off is applied in the pressure-sealed direction of the butterfly. This side is generally called the "preferential direction".

The leakage values found in this configuration commonly range between 0.1 and 1 Ncm$^3$/mn per millimetre of diameter of the butterfly.

In these constructions, when the pressure is applied in the opposite direction, which is referred to as the "non-pressure-sealed direction", the sealing performance is generally lower, the leakage commonly being equivalent to twice that found in the pressure-sealed direction. These valves are therefore not completely bidirectional.

That is particularly true in the case of all metal gaskets which simultaneously bring about static sealing between themselves and the support for the gasket, which may be the butterfly or the body depending upon whether they are mounted in the butterfly or the body, and dynamic sealing between themselves and the sealing seat. This is the case whether the gaskets are solid, as in the following patents: FR 2674599, EP 0145632, DE 10250774, FR 2698147 and DE 2057305, or else lamellar, as in patents FR 2773202 and U.S. Pat. No. 3,945,398.

The main reason for this difference in behaviour is that the powerful clamping of the gasket for the purpose of obtaining static sealing greatly impedes the freedom of the gasket to bring about the contact pressure against the seat for bringing about dynamic sealing.

Where sheet-metal sealing gaskets are used, as in the following patents: GB 1536837, FR 2751716 and EP 0166641, static sealing is correctly brought about and the flexibility of the gasket also correctly brings about dynamic sealing in the pressure-sealed direction. However, this same flexibility greatly impedes sealing in cases where the pressure is applied in the non-pressure-sealed direction, because displacement of the gasket in the non-pressure-sealed direction occurs.

There are also gaskets which separate the static-sealing function from the dynamic-sealing function. This is explained particularly clearly in the following patents: FR 2398940, FR 2615580 and FR 2497905. This technology has the advantage of bringing about complete static sealing but suffers from one major drawback:

The guaranteed sealing of 0.1 to 1 Ncm$^3$/mn for a linear length of one millimetre of gasket diameter, only applies up to 25 bar of upstream/downstream pressure. The fact is, because of the flexibility of the construction involving a torus of rolled sheet-metal, this type of gasket does not allow a contact pressure higher than 25 bar to be brought about in dynamic sealing. Moreover, the stresses developed at pressures greater than 25 bar induce contact stresses and coefficients of friction between the rolled metal sheet and the seat which lead to the unrolling of the external metal sheet and therefore to the destruction of the gasket.

The invention mitigates the deficiencies explained above. The proposal is to produce, in a new mode of design, a sealing gasket of the metal-against-metal type for a butterfly valve, which gasket is capable of sealing service pressures of up to 100 bar with a level of sealing better than 0.1 Ncm$^3$/mn per millimetre of diameter of the closure member or of the butterfly; the special feature of this type of sealing being that it is equivalent, whether the pressure is applied in the upstream/downstream direction, the so-called "pressure-sealed" direction, or in the downstream/upstream direction, the so-called "non-pressure-sealed" direction.

The subject of the invention is therefore a valve comprising an annular body, a butterfly which is mounted therein in a manner rotating at 90°, and an annular metal gasket which is interposed between them while being accommodated in a housing belonging to one of them, whereas the other of them forms a seat which is inclined in relation to the axis of the gasket and with which the free lateral face of a dynamic-sealing element of the gasket is in contact when the valve is in a closed position, said dynamic-sealing element being connected by a metal sheet to an elastic static-sealing element which is clamped in the housing, preferably in a radial direction perpendicular to the axis of flow of the fluid within the body of the valve and of the piping, the dynamic-sealing element having a first part, on the same side as the static-sealing element, which is in contact, via the two main faces, with the housing, and a second part, on the same side as the seat, where there is a clearance between the housing and the main faces of the dynamic-sealing element, when the said dynamic-sealing element is at a distance from the seat. The two main faces of the dynamic-sealing element are the faces which extend radially in relation to the axis of the body of the valve.

The invention thus eliminates the interaction of the dynamic sealing with the static sealing by incorporating a flexible element between these two functions. The clearance between the housing and the dynamic-sealing element means that the second part of the said dynamic-sealing element, which is the part closest to the seat, is able to rock under the effect of the compressive forces, the first part then being applied to the housing along a circular line, when the dynamic-sealing element is applied to the seat. The point of contact of the first part with the housing is closer to the face which is furthest away from the seat than it is to the face which is closest to the seat.

The static-sealing spring element is in contact, via its front face which is furthest away from the dynamic-sealing element, with the housing in such a way that there is applied to said element a radial contact pressure which is substantially perpendicular to the axis of the annular body.

The flexible metal sheet and the spring element set up static sealing of the gasket in the housing of the body as a result of radial contact pressure which is substantially perpendicular to the axis of the annular body and has a value greater than the value of the difference in the pressure to be sealed off between the upstream side and the downstream side of the valve.

The metal sheet preferably has flexibility corrugations which have their concave side facing towards the outside, a fact which manages the space occupied by the gasket and distributes the deformation of the metal sheet in the best possible way. In other modes of embodiment, the concave side of the corrugations may face towards the inside.

The first part of the main faces is preferably applied to the housing along a circular line, when the dynamic-sealing element is applied to the seat, whether the pressure is directed from the upstream side towards the downstream side (P), or vice verse (P'). It is better that the circle of contact (X) or (Y) of the first part with the housing is closer to that face of the dynamic-sealing element which is furthest away from the seat than it is to the face which is closest to the seat, according to whether the pressure is directed from the upstream side towards the downstream side (P) in the case of (X), or vice versa (P') in the case of (Y).

According to a mode of embodiment which is greatly preferred, the housing comprises a setback on the same side as its opening and the dynamic-sealing element extends only at right angles to the said setback. The dynamic-sealing element has, on the opposite side to its free lateral face, a bead which is in contact with the setback. This greatly facilitates the rocking of the dynamic-sealing element and thus makes it possible to withstand the compressive forces better.

The free edge of the metal sheet may be welded to the dynamic-sealing element but it is preferable if, in order not to damage the properties of the metal materials because of the weld, the free edge of the metal sheet is crimped in the dynamic-sealing element.

According to one mode of embodiment which is very advantageous, the contact surface between the dynamic-sealing element and the seat comprises a rounded lip whose convex side faces towards the seat and, preferably, two rounded lips of semi-toric shape with a radius which has a value of one tenth to one eighth of the width of the dynamic-sealing element. Located on the outside of the edge, between the two lips, there is machined a recess, the depth of which represents from one twentieth to one eighth of the width of the edge of the dynamic-sealing element.

The advantages of this construction are as follows:
  on the one hand, that a contact which has the shape of a line is obtained between the gasket and its seat; this implies that, since the contact surface is reduced to a line, the contact pressure will increase in a manner inversely proportional to the reduction in surface area and, consequently, the sealing pressure will be increased by the same proportion; and
  on the other hand, if the butterfly of the valve is not strictly in the fully closed position, the contact will be displaced so as to form a new line of contact; this is an immense advantage compared to numerous valves, whose complementary surfaces between the gasket and the seat do not tolerate any imperfection in positioning or in manufacturing tolerance for the purpose of bringing about complete sealing.

The invention is therefore much more tolerant of deviations in manufacture and mounting.

In one mode of embodiment, the flexible metal sheet comprises two side-pieces and a ring is interposed between the two side-pieces with clearance between it and each of the side-pieces when the gasket is not subjected to a compressive force in the direction of its axis. The dimensions of the said ring are such that there is a clearance between all its faces and the dynamic and static elements of the gasket. The ring limits the deformation of the metal sheet under the effect of pressure, since the ring is located at right angles to the two flexibility corrugations of the side-pieces.

The valve may be a butterfly valve with double off-centring and a spherical seat, a butterfly valve with double off-centring and a conical seat, a butterfly valve with triple off-centring and a conical seat or a valve with triple off-centring and a toric seat.

In the appended drawings, which are given solely on an exemplary basis:

Figure 1:
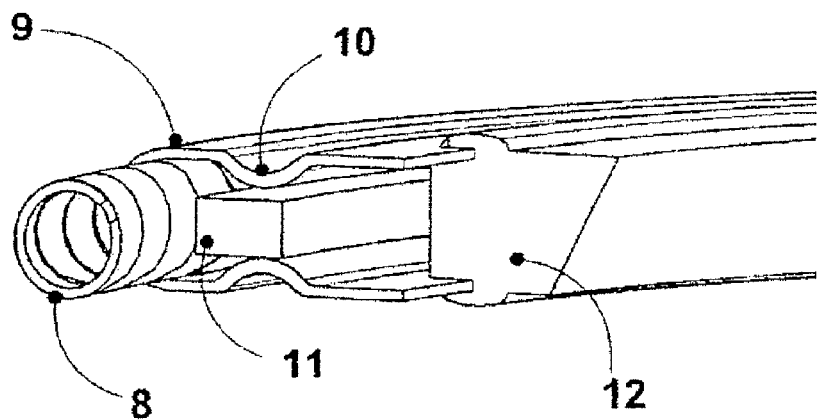
FIG. 1 is a view in perspective and in cutaway section of a metal gasket which is used in the valves according to the invention.
Figure 2:
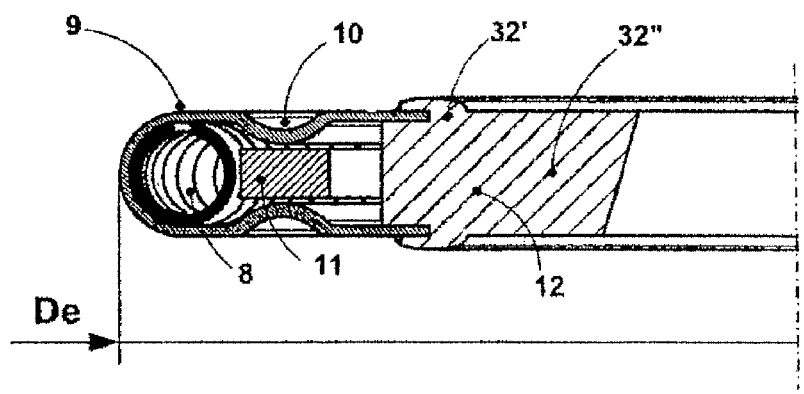
FIG. 2 is a partial view in section.

According to FIGS. 1 and 2, the static-sealing function is brought about by a toric gasket which is made up of a metal spring 8 wound in a spiral and connected to a metal sheet 9. The external diameter De of the torus thus formed has a value which is greater than the diameter Di of the housing provided in the body 101, in such a way as to obtain radial clamping E2 which brings about a radial contact pressure which is greater than the pressure of the fluid to be sealed off.

The metal sheet 9, which is wound over 180° around the spring 8, is provided, over each of the main external faces of the gasket, with a flexible corrugation 10 which enables the static gasket to remain fixed and immobilised within the body, while the annular dynamic gasket 12 retains its freedom of radial expansion when it is acted upon by the contact stresses between itself and the sealing seat.

The gasket 12 comprises a first part 32' on the same side as the metal sheet 9 and a second part 32" on the opposite side, namely on the same side as the butterfly of a valve. The first part has a larger transverse section than the second part.

Figure 10:
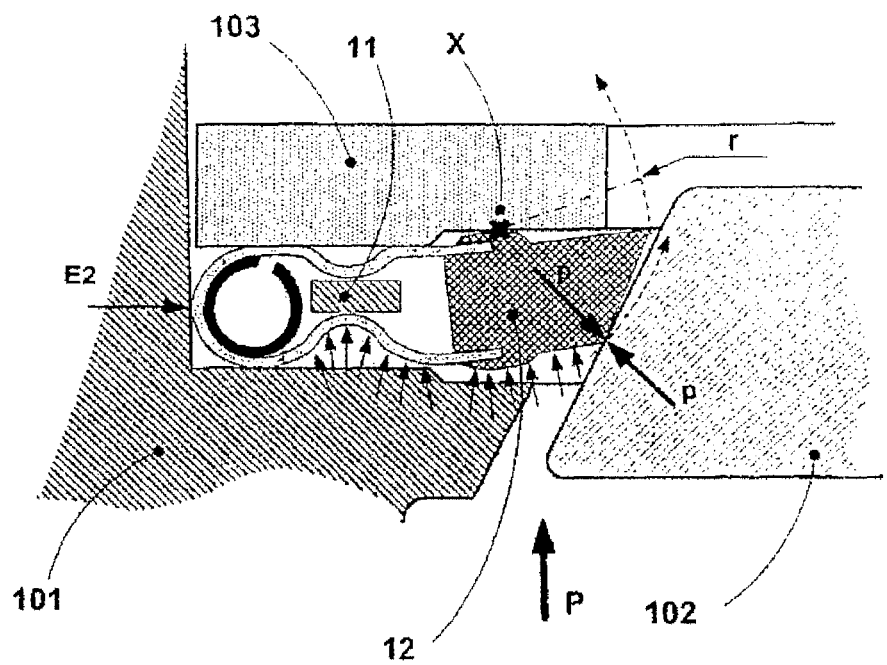
Figure 11:
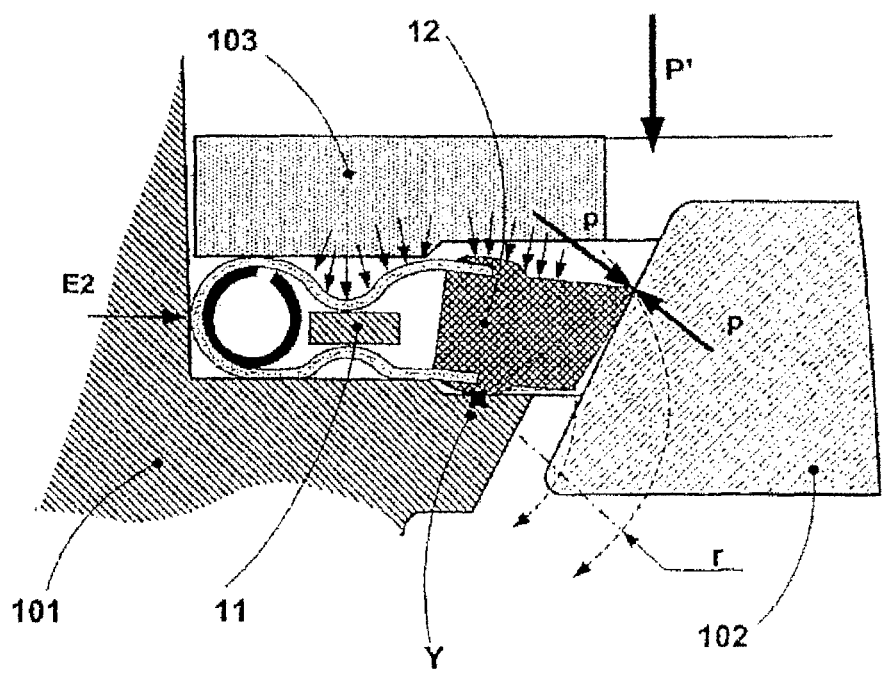

So that the compressive stresses do not deform the metal sheet 9, a ring 11 is located concentrically with the spring 8 inside the gasket, at right angles to the two flexibility corrugations 10. The dimensions of this ring 11 are such that there is a clearance between all its faces and the spring 8, the corrugations 10 and the dynamic-sealing element 12. In this way, when the pressure to be sealed off is applied to one of the faces of the gasket, the metal sheet 9 and its corrugations 10 are supported by the said ring so as to limit the deformation of the metal sheet. FIGS. 10 and 11 show this special feature of the construction.

In one variant, the spring torus with axial clamping is replaced by a ring 50 or 60 with a diameter larger than its housing so as to bring about radial clamping with cryogenic fitting.

Figure 3:
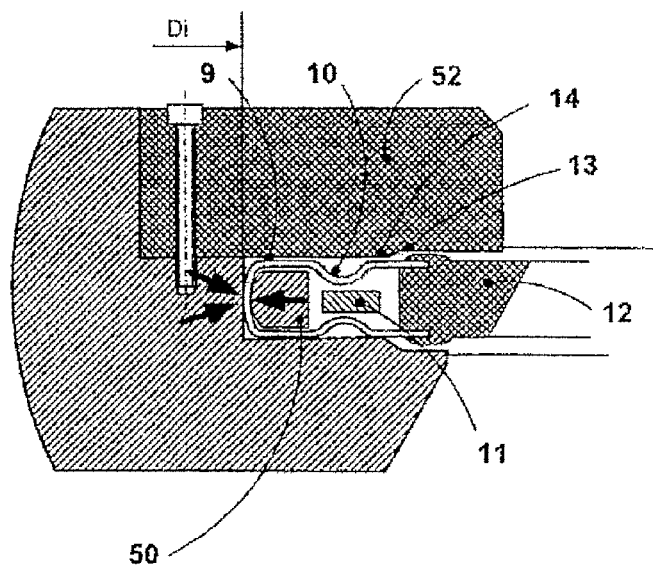
FIG. 3 is a view in section of another mode of embodiment of a valve according to the invention.

The torus is replaced by the ring 50 which, by virtue of its construction, imposes upon the gasket an external diameter De which is larger than the internal diameter Di of the body, as shown in FIG. 3.

Figure 4:
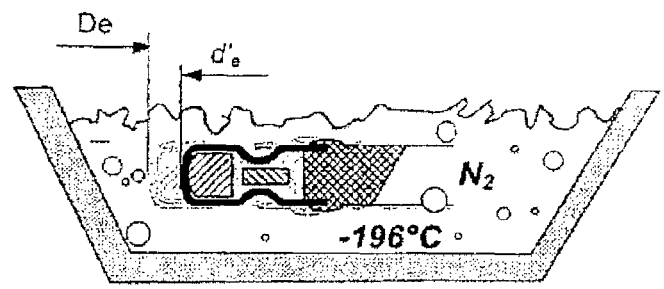
FIGS. 4 and 5 illustrate how the gasket in FIG. 3 functions.
Figure 5:
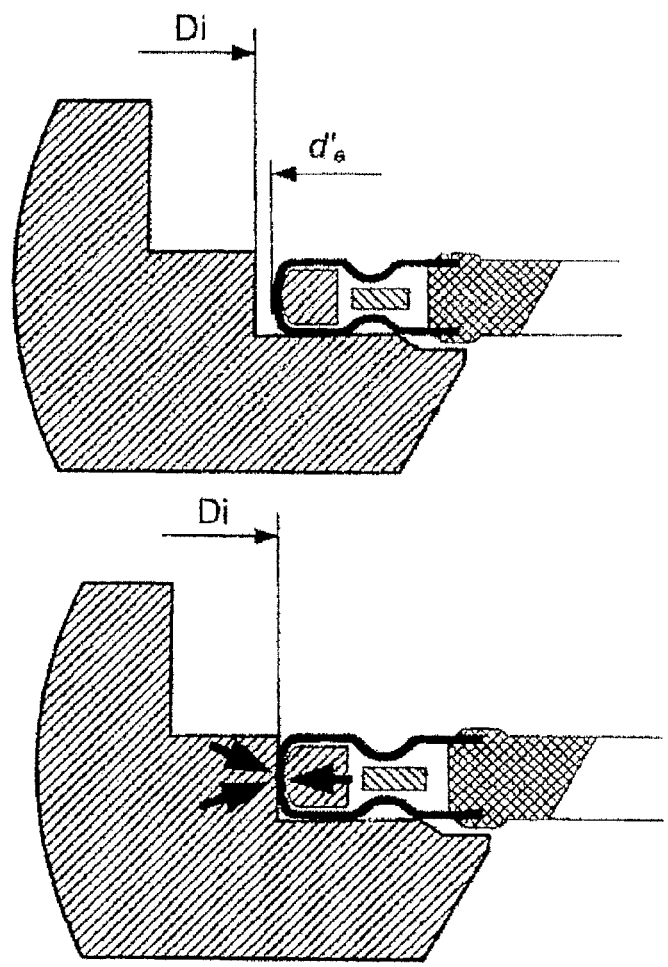

If the gasket is immersed in a bath of liquid nitrogen at −196° C., it will contract by a value of the order of 10 μm/° C./metre, as FIG. 4 shows. When the gasket is at the same temperature as the liquid nitrogen and its diameter De has become smaller than the diameter D1, said gasket is placed in the body, as shown in FIG. 5, which body itself is at ambient temperature. When the gasket and the body have returned to the same temperature, the ring 50 will compress the envelope 9 of the metal sheet formed between itself and the body which will bring about the static sealing. Demounting of this gasket involves the destruction of the envelope 9 and therefore of the gasket itself.

Figure 6:
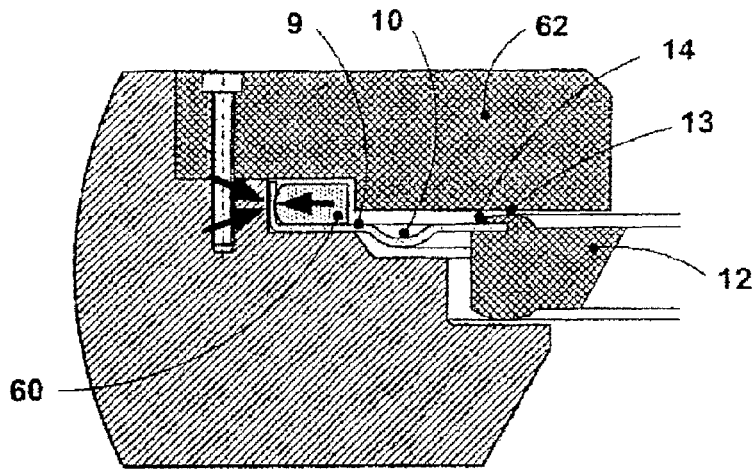
FIG. 6 is a view in section of another mode of embodiment of a valve according to the invention.

In one simplified mode of construction, it is possible to imagine the same principle while using a single metal sheet formed in accordance with FIG. 6, in which the ring 60 brings about the same function as the ring 50 or the spring 8 belonging to the preceding versions.

Mounting and Closure Without Pressure

Figure 7:
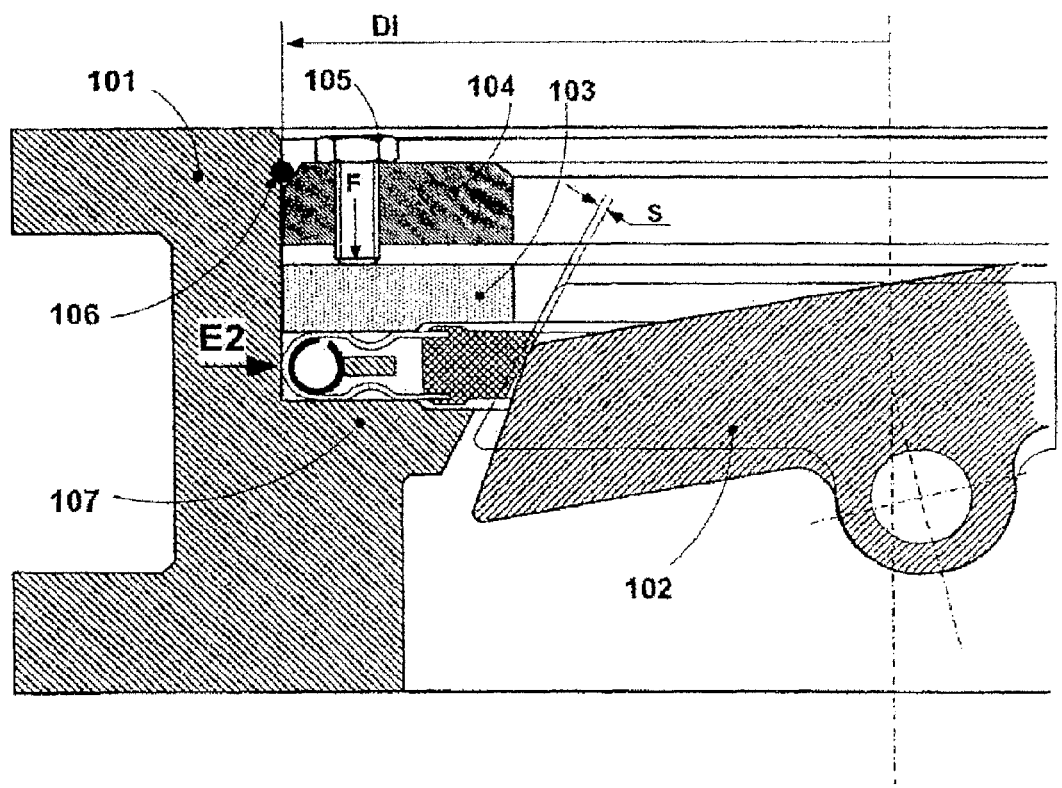
FIGS. 7 to 11 illustrate the behaviour of the valve under operating conditions.

As shown in FIG. 7, the gasket, as described in the figures, is intended to be mounted in a housing belonging to the body 101 of the valve, while the butterfly 102 proves to be the sealing seat of the dynamic gasket. It is also possible to mount the gasket in a housing belonging to the butterfly and to form the seat by means of the body.

In order to bring about the static sealing of the gasket, the latter, which has an external diameter De, is mounted in a shoulder belonging to the body 101 with an internal diameter Di which is smaller than De, whereas the clamping flange 103, the clamping counter-flange 104, the screws 105 and the locking ring cooperate in order to bring about the clamping stress F which produces the radial contact pressure E2. This static sealing is brought about whether the pressure of the fluid to be sealed off is applied from the upstream side towards the downstream side or vice versa.

Figure 8:
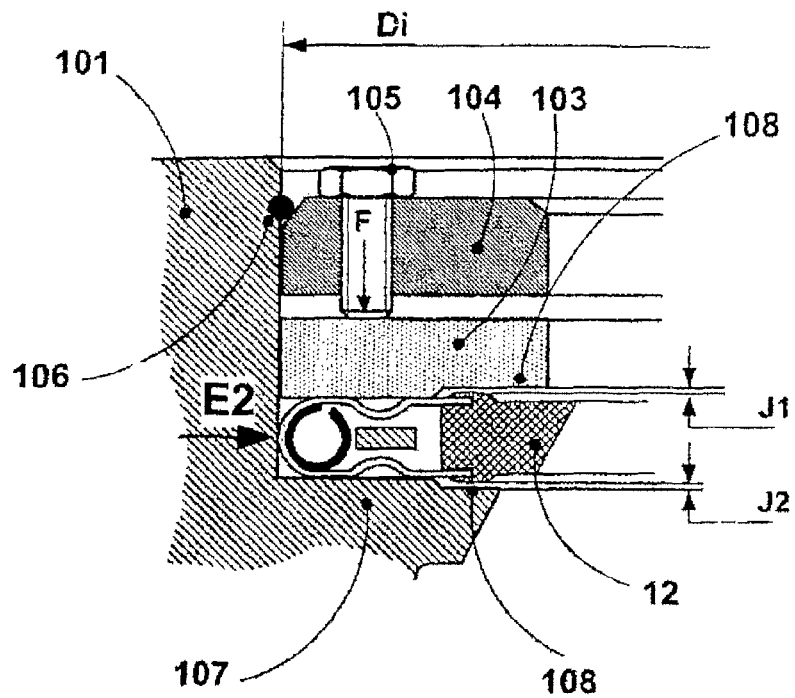

In order to separate the static sealing from the dynamic sealing, the mode of construction which is shown in detail in FIG. 8 will be described below. The shoulder 107 of the body 101 and the clamping flange 103 are each provided with a setback 108, which setbacks bring about the clearances J1 and J2 between the dynamic part of the gasket and its housing. In this way, the static gasket is immobilised between the clamping flange 103 and the body 101, while the dynamic part of the gasket is free from any contact, except from the rolled metal sheet 9.

The sealing gasket being mounted in the body, we will now describe the interaction of the butterfly 102 and the gasket for the purpose of dealing with the dynamic sealing. Referring to FIG. 7, the external diameter of the butterfly 102 is larger than the internal diameter of the dynamic gasket 12. This causes interference of the butterfly S on said dynamic gasket 12. Since the closing stress of the butterfly 102 is greater than the mechanical strength of the sealing gasket 12, the latter will deform in order to allow the butterfly to take up position within its internal circumference.

Figure 9:
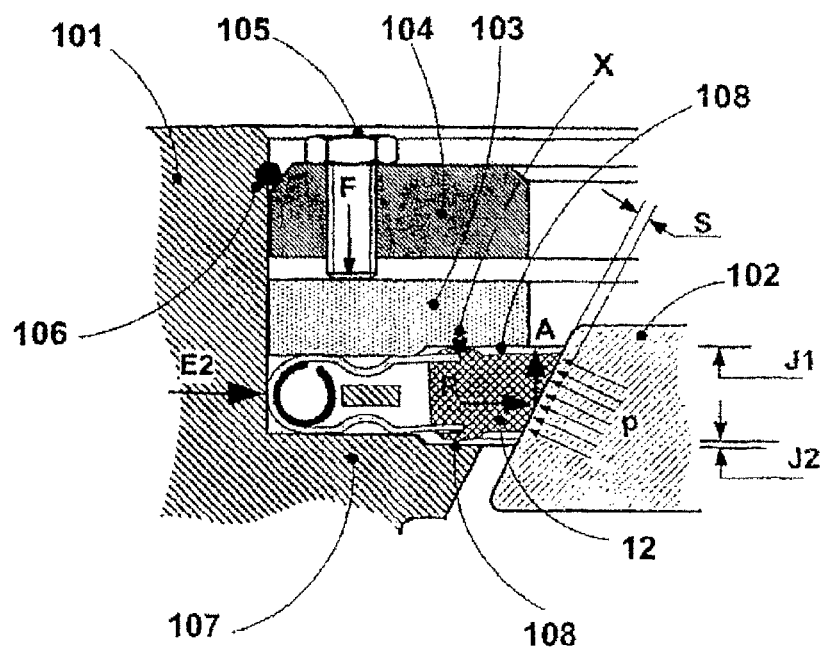

FIG. 9 shows the closed position of the butterfly 102 after the latter has taken up position within the dynamic gasket 12. Since the material of the dynamic gasket 12 has been specially chosen for its characteristics of elongation and resistance to traction, the result is a contact pressure which, by reaction on the gasket 12, breaks down into a force A which gives rise to the axial pushing-back of the gasket 12 until it makes contact with the clamping flange 103, and eliminates the clearance J1 and the increase in the clearance J2, while the radial force R cooperates in the contact pressure between the butterfly 102 and the dynamic gasket 12 which brings about the dynamic sealing of the valve. The rolled metal sheet 9 permits displacement of the gasket 12 while continuing to bring about sealing between the dynamic gasket 12 and the static semi-torus.

Behaviour Under Upstream Pressure

The butterfly 102 being closed, the upstream pressure is set up and will act upon the components internal to the jet in the valve. FIG. 10 shows the behaviour of the gasket when the said pressure P is set up.

When the pressure rises, this pressure is distributed over the whole of the butterfly and face of the gasket which are exposed to the said pressure. The sealing gasket 12, 9, 11 is subjected to the thrust of the pressure P and is thus pushed back towards the clamping flange 103. This thrust gives rise to the displacement and deformation of the metal sheet 9 by the value of the clearances included between the metal sheet 9 and the ring 11 that limits crushing; until all the pieces are in contact against the clamping flange 103. The dynamic gasket 12, which is already in contact with the flange 103 at the point X is therefore located in a slanting manner under the effect of the pressure P. This gives rise to a rotational movement of the section of this gasket about the point X which proves to be the centre of rotation of the section.

This feature, which is particularly innovative, gives rise, on the upstream generatrix of the sealing surface, to a super-compression p which is the stronger, the greater the pressure. In this way, we therefore obtain pressure-sealed sealing which is directly proportional to the pressure.

Behaviour Under Downstream Pressure

The butterfly 102 being closed, the downstream pressure is set up and will act upon the components internal to the jet in the valve. FIG. 11 shows the behaviour of the gasket when the said pressure P' is set up.

When the pressure rises, this pressure is distributed over the whole of the butterfly and face of the gasket which are exposed to the said pressure. The sealing gasket 12, 9, 11 is subjected to the thrust of the pressure P and is thus pushed back towards the body 101. This thrust gives rise to the displacement and deformation of the metal sheet 9 by the value of the clearances included between the metal sheet 9 and the ring 11 that limits crushing; until all the pieces are in contact against the body 101.

The dynamic gasket 12 is then displaced until it is supported on the body 101 at the point Y. Starting out from this position, it is located in a slanting manner under the effect of the pressure 2'. This gives rise to a rotational movement of the section of this gasket about the point Y which proves to be the centre of rotation of the section.

This feature, which is, in particular, still more innovative, gives rise, on the downstream generatrix of the sealing surface, to a super-compression p which is the stronger, the greater the pressure. In this way, we therefore obtain pressure-sealed sealing which is directly proportional to the pressure.

The architecture of this gasket thus makes it possible to obtain a butterfly valve which is completely pressure-sealed in both directions of application of the pressure, a fact which is particularly innovative by comparison with all the systems which exist to date.

Figure 12:
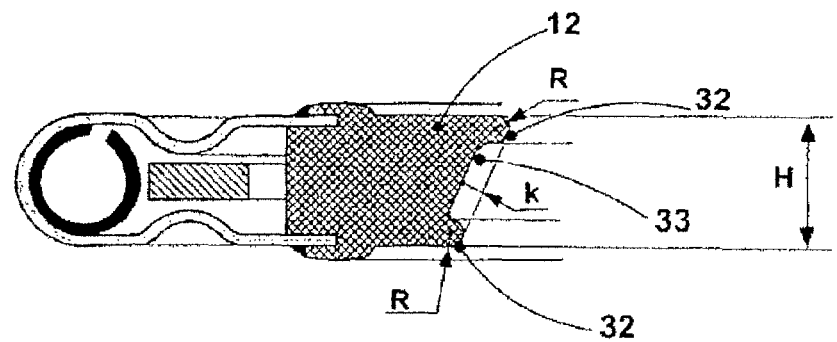
FIGS. 12 to 14 illustrate an improvement to the valve according to the invention.
Figure 13:
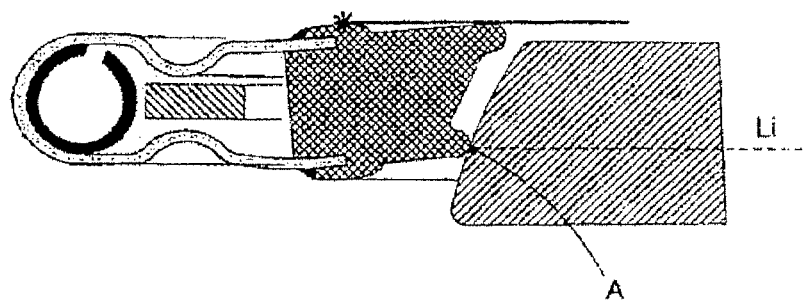
Figure 14:
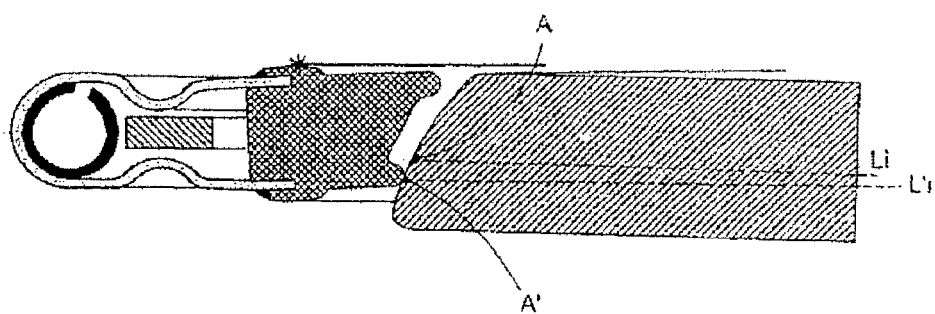

In one improvement, which is shown in FIG. 12, lips 32 are provided which have a semi-toric shape with a radius R which has a value of one tenth to one eighth of the width H of the edge of the gasket. Between the two lips 32, which are located on the outside of the edge, there is machined a recess 33, the depth k of which has a value of between one twentieth and one eighth of H. Two beads 34 are formed on the main faces of the dynamic-sealing element on that side of said dynamic-sealing element which faces towards the static-sealing element.

In order to be able to use this type of gasket in all temperature areas, from cryogenics to heat-machine exhausts, these gaskets may combine any type of metallic materials.

In cryogenics, materials which retain acceptable mechanical characteristics down to $-196°$ C. will be favoured, namely a highly alloyed stainless steel of the chrome/nickel/cobalt type for the spring 8. Its inherent characteristics, combined with heavy work-hardening due to the shaping of the spring impart to the latter satisfactory characteristics of elasticity at all temperatures. The rolled metal sheet 9 must be sufficiently malleable to be suitable for the static bearing-surface condition and to bring about satisfactory sealing. An austenitic stainless steel of type 316 or 316L will therefore be chosen. For the same reasons, this same material will be chosen for the dynamic gasket 12.

The material for the deformation-limiting ring 11 does not really need any special characteristic or grade.

In the case of applications involving average temperatures of between −50° C. and +270° C., the material of the spring will remain the same while, for the metal sheet 9 and the dynamic gasket 12, metals will be chosen which have satisfactory malleability and a satisfactory coefficient of friction in relation to the austenitic stainless steel constituting the seat. For example, work-hardened copper, brass or flexible bronze such as beryllium-type bronze will be chosen.

In the case of applications involving high temperatures of between +270° C. and +600° C., the material of the spring will remain the same while, for the metal sheet 9 and the dynamic gasket 12, refractory metals will be chosen which retain mechanical characteristics that are acceptable at these high temperatures, while at the same time having a coefficient of friction which is acceptable in relation to the austenitic stainless steel constituting the seat. For example, an austenitic stainless steel with a controlled level of silicone of type 1.4845 or 310 or 309s will be chosen.

The invention claimed is:

1. Valve comprising an annular body, a butterfly which is mounted therein in a manner rotating at 90°, and an annular metal gasket having an axis and a dynamic-sealing element with a lateral face and main faces, wherein the gasket is interposed between the body and the butterfly while being accommodated in a housing belonging to one of the body and the butterfly, whereas the other of the body and the butterfly forms a seat which is inclined in relation to the axis of the gasket and with which the free lateral face of the dynamic-sealing element of the gasket is in contact when the valve is in a closed position, said dynamic-sealing element being connected by a metal sheet to a spring static-sealing element which is clamped in the housing,
wherein:
 the metal sheet is flexible;
 the dynamic-sealing element has a first part, on the same side as the static-sealing element, which is in contact with the housing, and a second part, on the same side as the seat, wherein there is a clearance between the housing and the main faces of the dynamic-sealing element, when the said dynamic-sealing element is at a distance from the seat; and
 the flexible metal sheet comprises two side-pieces and a ring is interposed between the two side-pieces with clearance between it and each of the side-pieces when the gasket is not subjected to a compressive force in the direction of its axis.

2. Valve according to claim 1, characterised in that the static-sealing spring element has a front face and is in contact, via its front face which is furthest away from the dynamic-sealing element, with the housing in such a way that there is applied to said element a radial contact pressure which is substantially perpendicular to the axis of the annular body.

3. Valve according to claim 1, characterised in that the first part of the main faces is applied to the housing along a circular line, when the dynamic-sealing element is applied to the, whether the pressure is directed from the upstream side towards the downstream side, or vice versa.

4. Valve according to claim 3, characterised in that the circular line of contact (X) or (Y) of the first part with the housing is closer to that face of the dynamic-sealing element which is furthest away from the seat than it is to the face which is closest to the seat, according to whether the pressure is directed from the upstream side towards the downstream side in the case of (X), or vice versa in the case of (Y).

5. Valve according to claim 1, characterised in that the metal sheet has a flexibility corrugation which has its concave side facing towards the outside.

6. Valve according to claim 1, characterised in that the housing comprises a setback on the same side as its opening and the dynamic-sealing element extends only at right angles to the said setback.

7. Valve according to claim 6, characterised in that the dynamic-sealing element has, on the opposite side to its free lateral surface, a bead which is in contact with the setback.

8. Valve according to claim 1, characterised in that one edge of the metal sheet is crimped in the dynamic-sealing element.

9. Valve according to claim 1, characterised in that the contact surface between the dynamic-sealing element and the seat comprises a rounded lip whose convex side faces towards the seat.

10. Valve according to claim 9, characterised in that the rounded lip is of semi-toric shape with a radius R representing from one tenth to one eighth of the width of the edge of the dynamic-sealing element.

11. Valve according to claim 10, characterised in that there are two rounded lips and a recess is machined between them in the dynamic-sealing element, the depth of the recess representing from one twentieth to one eighth of the width of the edge of the gasket.

* * * * *